Patented Nov. 15, 1932

1,887,958

UNITED STATES PATENT OFFICE

GUSTAV SCHWEN, OF LUDWIGSHAFEN-ON-THE-RHINE, AND HANS KRZIKALLA, OF MANNHEIM, GERMANY, ASSIGNORS TO I. G. FARBENINDUSTRIE AKTIENGESELLSCHAFT, OF FRANKFORT-ON-THE-MAIN, GERMANY

WEIGHTING ANIMAL HAIRS

No Drawing. Application filed November 6, 1930, Serial No. 493,909, and in Germany November 19, 1929.

The present invention relates to weighting animal hairs.

It is already known that textiles and the like of animal fibres, especially wool, are frequently treated with water-soluble products, as for example Glauber's salt, urea vegetable products such as caragheen moss extract, starch and the like in order to improve the touch and appearance as well as to increase the weight. All these products, however, have the objection that, for want of affinity for the wool fibres, they are comparatively easily removed again. For example if a material impregnated with the products hereinbefore mentioned, as for example Glauber's salt, be exposed to the rain, the filling material is removed and the goods assume their original objectionable external properties, such as flaccid touch, bad crease lines, crumpled appearance and the like. The same objections are apparent after washing goods treated in this manner.

We have now found that animal hairs, such as wool, or fabrics made therefrom, can be weighted in an advantageous manner by treating them with aqueous preparations containing at least 10 per cent by weight of the hairs of water-soluble organic non-dyeing halogenated compounds of high molecular weight which have an affinity for animal fibres. The quantities of these compounds to be employed in each case depend on the desired degree of weighting and on the affinity for the animal fibre of the compounds concerned and are so chosen that at least 5 per cent, calculated with reference to the goods, go on to the hairs. Especially halogenated organic compounds of high molecular weight which have an acid character or which contain acid groups and which have an affinity for the fibres, as well as neutral or acid salts of these are suitable for this purpose. The effect can be increased in most cases, especially when employing neutral salts, by an addition of acid agents which are easily soluble in water, such as formic, acetic, oxalic, tartaric, hydrochloric or sulphuric acids or acid salts of such acids, which acid agents are necessary if the aforesaid compounds are employed in the form of salts. The fastness of the resulting weighting to washing is generally dependent on the molecular weight of the compound employed, and the products of the aforesaid nature having the highest molecular weight usually have the better fastness to washing. Suitable substances for use according to the present invention are water-soluble practically non-dyeing halogenated substances which contain acid radicles such as sulphonic, sulphuric, phosphoric, carboxyl and like radicles and, generally speaking, have a molecular weight of at least 200. The said substances may be derived from open chain or cyclic aliphatic, aromatic or aliphatic-aromatic hydrocarbons or their derivatives which contain hydroxy, amino alkoxy, carbonyl and the like groups which, however, must not possess a chromophorous effect in the particular compound employed.

In order to carry out the process according to the present invention, the animal fibres may be treated with the said products for example by dissolving or suspending the said products in water or another suitable liquid and causing them to act on the fibres at room temperature or while warming. It is also possible to carry out the impregnation of the fibres by slop-padding, padding or printing and if desired subsequent steaming.

The treatment of the animal fibres may also be carried out together with some other process of textile improvement. Thus for example those products which go on the animal fibres from acid solution while warming may be added to the acid dye-bath and allowed to go on the fibres together with the dyestuff. Or the dyestuff may be allowed to go on first, the said products being allowed to go on subsequently but in the same bath.

The treatment of the animal hair may be carried out with the latter in the form of finished fabrics or in the form of loose fibres or skeins. The treatment may be applied in addition to wool, to the hair of any animals, such as hares, rabbits, camels, cows and like animal hair.

Thus for example it is possible according to the present invention to start with an inferior, light and thin woollen material of bad touch and objectionable creasing lines and to prepare therefrom superior goods having a full, powerful touch as well as excellent creasing lines; at the same time the weight of the goods is increased, which as is well known improves the quality of woollen goods. The impregnation thus effected cannot be rendered of none effect by treatment with water or soap solutions, or at the most there is a negligible decrease in the impregnation.

The following examples will further illustrate the nature of this invention, but the invention is not restricted to these examples.

Example 1

100 kilograms of loose wool are treated for one hour with an aqueous solution of 50 kilograms of 2.3.6-trichloraniline sulphonic acid and 10 kilograms of sulphuric acid in 2 cubic metres of water at the boiling temperature and are then thoroughly rinsed. By this treatment the wool increases in weight by about 19 per cent and acquires a full touch. The weighted goods only decrease slightly in weight when treated with water. In a similar manner, derivatives of trichloraniline sulphonic acid may be employed, as for example products benzoylated in the amino group, which products have a still better fastness to washing than the non-benzoylated compound.

Example 2

100 kilograms of wool are treated for half an hour with an aqueous solution of 50 kilograms of 2'.4'-dichlorbenzoyl-K-acid.

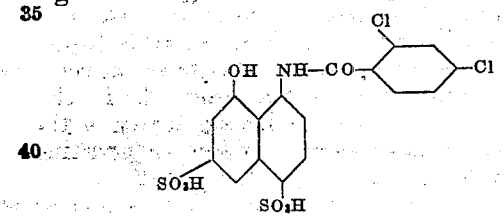

and 5 per cent of sulphuric acid of 66° Baumé strength on 2.5 cubic metres of water. There is an increase in weight of 20 per cent and a substantial improvement in the touch of the wool.

Example 3

50 kilograms of woolen piece goods are treated in a reel vat for from 1 to 1½ hours at from 90 to 95° C. with an aqueous solution of 10 kilograms of trichlor naphthalene sulphonic acid and 5 kilograms of sulphuric acid of 66° Baumé strength in 1 cubic metre of water. After rinsing and drying the goods show a considerable increase in weight. The touch is extremely powerful and soft and unattainable with the fillers hitherto used such as urea, Glauber's salt, carragheen moss extract and the like.

Example 4

50 kilograms of light woollen fabrics are treated for one hour in a boiling aqueous solution of 10 kilograms of the condensation product from 2.4-dichlorphenol and benzaldehyde-ortho-sulphonic acid.

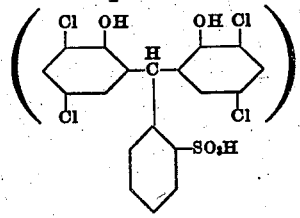

and 5 kilograms of Glauber's salt, 2.5 kilograms of acetic acid and 1.5 kilograms of sulphuric acid in 2 cubic metres of water. In this manner goods having substantially improved quality are obtained. The increase in weight amounts to 17.5 per cent.

Example 5

5 kilograms of woollen yarn are treated at from 80° to 100° C. with an aqueous solution of 2.5 kilograms of the condensation product specified in Example 4, 0.5 kilogram of Glauber's salt, 0.25 kilogram of acetic acid of 6° Baumé strength and 0.5 kilogram of sulphuric acid of 66° Baumé strength in 200 kilograms of water, the weighting effect amounts to 35.5 per cent. The goods acquire a very powerful touch and the weighting is fast to water.

Example 6

A standard piece of light woollen fabric, 60 metres long and 12 kilograms in weight, is dyed on the reel vat in 50 times its weight of a bath which contains:

| | Grams |
|---|---|
| Cyananthrol R (Schultz, Farbstofftabellen, 1923, No. 859) | 96 |
| Sorbin red BBG (Schultz, Farbstofftabellen, 1923, No. 64) | 24 |
| Azoflavin RS (Schultz, Farbstofftabellen, 1923, No. 140) | 14 |
| Calcined Glauber's salt | 1200 |
| Acetic acid of 6° Baumé strength | 500 |

The temperature at the start is 50° C., and it is raised during the course of half an hour to the boiling temperature. 500 grams of sulphuric acid of 66° Baumé strength are then added, the whole is boiled for three quarters of an hour, 6 kilograms of the condensation product obtainable by condensing molecular proportions of phenol and orthochlor benzyl chloride in the presence of about 2½ molecular proportions of concentrated sulphuric acid at about 45° C., are added and the whole is boiled for another half an hour. The goods acquire a very full powerful touch and increase in weight by about 23 per cent by this treatment.

Example 7

30 kilograms of woollen yarn are boiled for one hour in a vat of 1 cubic metre of water and 15 kilograms of tetrachlorphthalic acid. In addition to a substantial improvement in touch, there is an increase in weight of 23 per cent. If 3 kilograms of sulphuric acid be also added the increase in weight rises to 29 per cent.

*Example 8*

50 kilograms of loose wool are dyed in a mechanical dyeing apparatus with an aqueous solution of 5 kilograms of sulphocyanin black BB (Schultz, Farbstofftabellen, 1923, No. 265), and 25 kilograms of tetrachlor phthalic acid in 1.2 cubic metres of water. At the start the temperature is 50° C. and this is raised slowly to the boiling temperature and the whole is boiled for 1½ hours. 62 kilograms of a loose wool dyed black are obtained which are characterized by a great filling power in weaving.

*Example 9*

Blanket yarn is treated for one hour with 20 times its weight of an aqueous solution of 30 per cent of tetrabromephthalic acid and 10 per cent of formic acid calculated on the weight of the yarn. The touch becomes full and powerful and the weight of the goods increases by about 16 per cent.

*Example 10*

Chlorinated woollen material is worked in the padding-mangle with a printing paste consisting of 300 parts by weight of the condensation product referred to in Example 6, 100 parts by weight of British gum thickening, 30 parts by weight of oxalic acid and 570 parts by weight of water, steamed in a round boiler and rinsed. The goods acquire a powerful full touch.

If the effect is only required at certain places on the fabric, the desired places are printed with the said mixture and the whole is then worked up in the usual manner.

*Example 11*

Woollen piece goods are dyed with about 30 times their weight of an aqueous solution containing 0.5 per cent by weight of the goods of cyananthrol R, 10 per cent of acetic acid of 6° Baumé strength and 10 per cent of the condensation product referred to in Example 4, while boiling for 1 hour. The dyed goods are considerably weighted and show a good touch and very uniform shades which cannot be obtained when dyeing with acetic acid only.

*Example 12*

A piece of fine wool cloth is dyed with 30 times its weight of an aqueous solution containing 1 per cent by weight of anthraquinone green (Schultz, Farbstofftabellen 1923, No. 864), 10 per cent of tetrachlor phthalic sodium salt and 3 per cent of formic acid at a temperature between 80° and 100° C. The cloth is considerably improved as regards its weight and its touch and the shades are much more uniform than can be obtained without the employment of the said sodium salt.

*Example 13*

10 kilograms of woollen piece goods are treated with a boiling solution in 500 litres of water of 2 kilograms of the sodium salt of a chlorinated stearic acid, containing about 50 per cent of chlorine, while gradually adding about 1 kilogram of ammonium acetate. The stearic acid goes onto the wool in a considerable quantity and strengthens it considerably.

In a similar manner other highly chlorinated acids of vegetal fats and oils and their synthetic equivalents, such as chlorinated acids of train oil, oleic acid, acids of soya bean oils, castor oil and the like chlorinated acids of high molecular weight may be employed. The said acids may also have been previously subjected to a sulphonation whereby their affinity to the fibres is increased. The said chlorinated fatty acids may be also replaced by chlorinated paraffin waxes which, for increasing their solubility in water, have been sulphonated if so desired.

Particularly valuable products can be obtained by chlorinating paraffin wax at from about 150° to 250° C. until it contains from about 40 to 55 per cent of chlorine, treating the product at from about 200° to 250° C. with alkali or with alkali earth metal hydroxide until the product shows an iodine value from about 30 to 50 and sulphonating the unsaturated product in any usual and convenient manner until a water-soluble product containing chlorine is obtained.

What we claim is:—

1. The process for weighting animal hairs which comprises acting on animal hairs with an aqueous preparation comprising at least 10 per cent by weight of the hairs of a water-soluble organic non-dyeing halogenated compound having a high molecular weight and an affinity for animal fibres.

2. The process for weighting animal hairs which comprises acting on animal hairs with an aqueous preparation comprising at least 10 per cent by weight of the hairs of a water-soluble organic non-dyeing halogenated compound containing an acid group and having a molecular weight of at least 200.

3. As new articles of manufacture animal hairs combined with and weighted by at least 5 per cent their weight of an organic non-dyeing halogenated compound having a high molecular weight and an affinity for animal fibres.

4. As new articles of manufacture animal hairs combined with and weighted by at least 5 per cent their weight of an organic non-dyeing halogenated compound containing an acid group and having a molecular weight of at least 200.

5. As new articles of manufacture animal hairs combined with and weighted by at least 5 per cent their weight of an aromatic, non-dyeing halogenated compound containing an acid group and having a molecular weight of at least 200.

6. As new articles of manufacture animal hairs combined with and weighted by at least 5 per cent their weight of an aromatic, non-dyeing halogenated compound containing at least one acid radicle, selected from the group consisting of carboxyl and sulphonic radicles, and having a molecular weight of at least 200.

7. As new articles of manufacture animal hairs combined with and weighted by at least 5 per cent of their weight of a polynuclear aromatic, non-dyeing halogenated compound containing at least one acid radicle selected from the group consisting of carboxyl and sulphonic radicles.

8. As new articles of manufacture animal hairs combined with and weighted by at least 5 per cent their weight of polyhalogenated phthalic acid.

9. As new articles of manufacture animal hairs combined with and weighted by at least 5 per cent their weight of a sulphonation product of a material selected from the group consisting of chlorinated paraffin waxes and of chlorinated acids of vegetal fats and oils.

In testimony whereof we have hereunto set our hands.

GUSTAV SCHWEN.
HANS KRZIKALLA.